United States Patent [19]

Broadley

[11] Patent Number: 4,768,737
[45] Date of Patent: Sep. 6, 1988

[54] HELICOPTER CONTROL SYSTEM
[75] Inventor: William D. Broadley, Downingtown, Pa.
[73] Assignee: PBSystems, Inc., Downingtown, Pa.
[21] Appl. No.: 21,150
[22] Filed: Mar. 2, 1987
[51] Int. Cl.[4] .............................................. B64C 27/82
[52] U.S. Cl. ..................................... 244/17.21; 244/6; 244/52; 244/23 B
[58] Field of Search ............... 244/6, 7 R, 12.3, 23 B, 244/17.11, 17.19, 17.21, 51, 52

[56] References Cited

U.S. PATENT DOCUMENTS

| | | | |
|---|---|---|---|
| 2,420,784 | 5/1947 | Larsen | 244/17.19 |
| 2,567,392 | 9/1951 | Naught | 244/52 |
| 2,968,453 | 1/1961 | Bright | 244/52 |
| 3,171,614 | 3/1965 | Holmer | 244/17.19 |
| 3,179,353 | 4/1965 | Peterson | 244/12.3 |
| 3,807,662 | 4/1974 | Velazquez | 244/17.19 |

FOREIGN PATENT DOCUMENTS 1933353  1/1971  Fed. Rep. of Germany ... 244/17.19

*Primary Examiner*—Galen Barefoot
*Attorney, Agent, or Firm*—Lipton & Famiglio

[57] ABSTRACT

An anti-torque system for use in a helicopter has an aft mounted horizontal fan submerged within a fuselage mounted, upward facing plenum. The fan operates off the mainpower source. The plenum has two controllable exit ports for counter torque control, fuselage pitch control and yaw control. The controllable exit ports are located along the longitudinal direction of the fuselage and each are substantially opposite each other. One port has a sufficiently sized area to effectively offset the torque of the main rotor while the other port has a sufficiently sized area to effectively provide autorotative yaw control. Both ports can be used simultaneous or singly.

9 Claims, 3 Drawing Sheets

HELICOPTER CONTROL SYSTEM

BACKGROUND OF THE INVENTION

1. Field of the Invention. This invention is related to the practice and teachings of the helicopter art.

2. Description of the prior Art. Example of helicopter teachings pertinent to this invention and which have been known prior to this invention are found in the disclosures of the following patents.

U.S. Pat. No. 2,369,652 provides an anti-torque air screw having an axis of rotation at right angle to the aircraft longitudinal axis. The air screw is located within fuselage. Louvers consisting of controllable vertical slates, which are closed when the anti-torque air screw is not operating, are located on the opposite side of the fuselage and relatively in line with the air flowing by the air screw.

U.S. Pat. No. 3,047,254 relates to yaw control means and U.S. Pat. No. 3,026,068 relates to automatic yaw controls means, both are for a helicopter. Both aforementioned patents disclose a source of high velocity air which is conducted to a position spaced from the center of gravity of the vehicle to the aft end of a tail boom and there directed in generally three different directions, either simultaneously or singly, to provide yaw control forces or forward thrust forces. The high velocity air, after passing the direction guides, discharges into the atmosphere. The source of high velocity air is a forward mounted fan aligned with the longitudinal axis of the helicopter and at a right angle to the plane of rotation of the rotary wings.

U.S. Pat. No. 3,059,877 discloses an anti-torque effect which is generated by passing the downwash of the rotor over the fuselage which has longitudinal slats emitting pressurized air from within the fuselage. The jets retard the downwash on one side of fuselage and accelerate the downwash on the other side and the two different velocities of flow cause a net force on the fuselage counter to the main rotor torque.

U.S Pat. No. 3,351,304 discloses a vertical-lift forward-thrust aircraft. An internal turbofan engine, which axis is aligned with the longitudinal axis of the aircraft, provides air to an aft aerodynamic valve.

U.S. Pat. No. 3,510,087 discloses an air coupling system for a helicopter which ejects a small portion of the air mass flow at the tail of the helicopter in a direction to counteract the torque created by the air coupling system. The larger balance of the air is directed downwardly, after passage through a turbine, thereby creating a direct lift independent of the rotor lift.

U.S. Pat. No. 3,807,662 discloses a main rotor-driven axial compressor fan feeding a variable-geometry nozzle at the end of an enlarged duct extending from a diffuser located immediately adjacent the fan, generating either an anti-torque moment or a forward propulsion thrust, or both. The fan is aligned with the longitudinal axis of the helicopter.

U.S. Pat. No. 4,200,252 discloses an helicopter anti-torque system consisting of slots extending longitudinally along the tail boom and a sheet of air is continuously discharged from the slots tangentially to the surface of the tail boom. The discharged area is supplied by a fan within the fuselage which directs a stream of air rearwardly into the tail boom. The tail boom is provided at its rear end with a laterally disposed aperture through which some of the fan-supplied air is discharged to create a direct jet thrust. The flow through the aperture is throttled to vary the anti-torque moment for trim and maneuvering.

British Patent No. 577,524 discloses an improved anti-torque propeller externally located aft on the fuselage.

British Patent No. 703,067 discloses a duct connecting an outlet opening at the surface of an aerofoil with a forwardly directed intake which opens at or in advance of the leading edge port of the aerofoil so that air entering the intake in consequence of forward motion of the aircraft issues from the outlet and produces a control force.

French Patent No. 1,298,518 discloses a centrally located, vertical fan and a long duct to vertical aft openings that direct the exiting air.

French Patent No. 883,462 discloses a duct pressurized from a source of air at the forward end, and two exists at the aft end. The exits located on the left and right sides of the fuselage are of different sizes, the left exit larger than the right exit. The right exit has a vertical flapper type shutter which can close or open to provide a force to the left. The two openings can work together for autorotation. For normal powered flight, the left exit operates independently of the right exit.

German Patent No. 1,933,353 discloses means for providing auxiliary forward thrust and yaw control. The main rotor is driven by air pumped from an engine to a rotor and out a blade tip producing little torque.

The aforementioned art is generally directed towards an anti-torque system and/or yaw control which also may effect forward thrust and/or lift and other flight characteristics. Generally the prior art performance is less than desireable and attempts are constantly being made to improve the prior art. The present invention, which is an improvement over the prior art, has advantages not obtainable via the prior art. The present invention has an aft mounted horizontal fan which is submerged within a fuselage mounted plenum. The upward facing plenum has two controllable ports for counter torque control, fuselage pitch control, and yaw control. The two controllable ports are used in combination or separately to achieve the desired control of torque, pitch and yaw.

Compared to a conventional tail rotor present invention has numerous advantages. These are as follows: The mounted horizontally rotor within the fuselage mounted plenum protects ground personnel from dangerous physical contact with a conventional tail rotor. Further said horizontally rotor is protected from the following: terrain strikes resulting from high flair angle and slope landings; vertical objects such as trees, walls, poles and the like near a landing or take off sites; foreign objects such as stones, hardware and the like being trapped in the tail rotor tip vortices and drawn into the rotor; and in-flight wire strikes. The main rotor is protected from stones, parts and debris because the horizontal rotor will not pass said stones, parts and debris to the main rotor.

Further the horizontal fan operating within the plenum's upward facing entrance reduces acoustic, radar, visual and infrared signature compared to a vertical tail rotor fan. Also the horizontal fan operating at the entrance to the plenum has little variation of inflow velocities across the plane of the tail rotor and therefore does not exhibit blade stall or compressibility effects associated with a free vertical tail rotor in forward flight. Still further the horizontal fan eliminates the high speed forward flight velocity limitations generally associated with the free vertical rotor; i.e. vibrations, stability and control problems, high stresses, and high blade flapping. Also still further the horizontal fan, being parallel to the main rotor plane, can operate under and within the main rotor radius thus shortening the fuselage length and thereby reduce the overall weight. Still further additional vertical lift is generated at the entrance, which may be suitable curved, to the plenum as air is drawn into the plenum. Still further as the plenum has horizontal vanes at the exit ports, in operation it can produces pitch attitude control in hover and forward flight. Also the horizontal fan generates torque which is counter to the torque produces by the main rotor. And further the increased fuselage width which may be necessary to accommodate the horizontal fan, may be used to contain additional items.

SUMMARY OF THE INVENTION

This invention relates to a rotary wing aircraft, and in particular is related to a helicopter, devoid of an exteriorly-mounted anti-torque rotor, having an aft mounted horizontal fan. Said fan is submerged within a fuselage mounted plenum. The plenum has two controllable exit ports which are located along the longitudinal direction of the fusela9e and each are substantially opposite each other on the side of the fuselage. When in operation, the fan pressurizes the plenum, and the two controllable exit ports are used in combination to counter torque caused by the main rotor, and in addition can be used in combination to control fuselage pitch and/or yaw. The description of how the invention and the controllable exit ports operated are contained hereinafter in connection with the accompanying Figures.

BRIEF DESCRIPTION OF THE DRAWINGS

FIG. 3 is the cross-sectional view with the two controllable exit ports both in a closed position. FIG. 4 is the cross sectional view with one of the controllable exit ports in a side way thrust position. FIG. 5 is the cross-sectional view with one of the controllable exit ports in either a downward or upward thrust position. FIG. 6 is the cross-sectional view with both of the controllable exit ports in a position providing thrust on both sides.

DESCRIPTION

Figure 1:
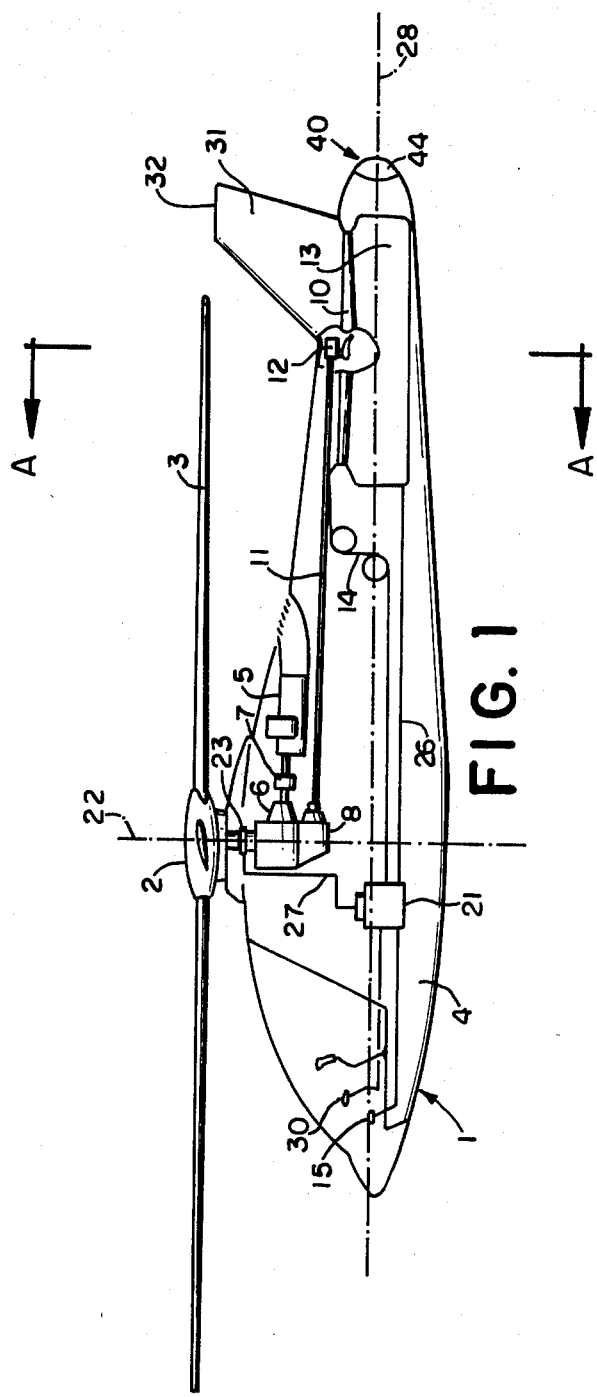
FIG. 1 is a horizontal side view, partly broken away, of an embodiment of the invention.

Turning now to the drawings in which like parts denoted by the same reference numeral throughout, there is shown in FIG. 1 a helicopter 1 of the type in which the present invention is employed. The main rotor 2 and attached blades 3 produces a torque which must be overcome to prevent fuselage 4 rotation so that the operator of helicopter 1 can establish a straight line of flight or yaw the helicopter 1 as desired.

The main rotor 2 is driven by the power plant 5 and connected to the main rotor transmission 6 through a one-way clutch 7. Attached to the main rotor transmission 6 is a tail rotor fan drive gear box 8. The tail rotor gear box 8 is driven by the power plant 5 or the main rotor 2. A power plant 5 failure would cause one way clutch 7 to disengage from the main rotor transmission 6 permitting the main rotor 2 to continue driving the horizontal axial flow variable pitch fan 10 through the tail fan drive gear box 8, fan drive shaft 11 and right angle gear box 12 assuring pressurization of the plenum 13 and control of torque and yaw. The horizontal axial flow variable pitch fan 10 has superimposed upon it the favorable main rotor disc loading pressures contained within the main rotor downwash. The diameter of said fan 10 is not restricted by its position relative to the ground.

The horizontal fan pitch controls 14 are operated by pilot yaw control pedals 15. The horizontal axial flow variable pitch fan 10 is supported by strut 16 and operates within the plenum 13 entrance so that plenum 13 is pressurized by the horizontal axial flow variable pitch fan 10. Said fan 10 is rotated counter to the main rotor 2 direction of rotation thereby providing a degree of counter torque to offset the main rotor torque. Said fan 10 generally is located near the entrance of the plenum. The edges of the entrance to the fan are suitable curved to meet air flow requirements.

Figure 2:
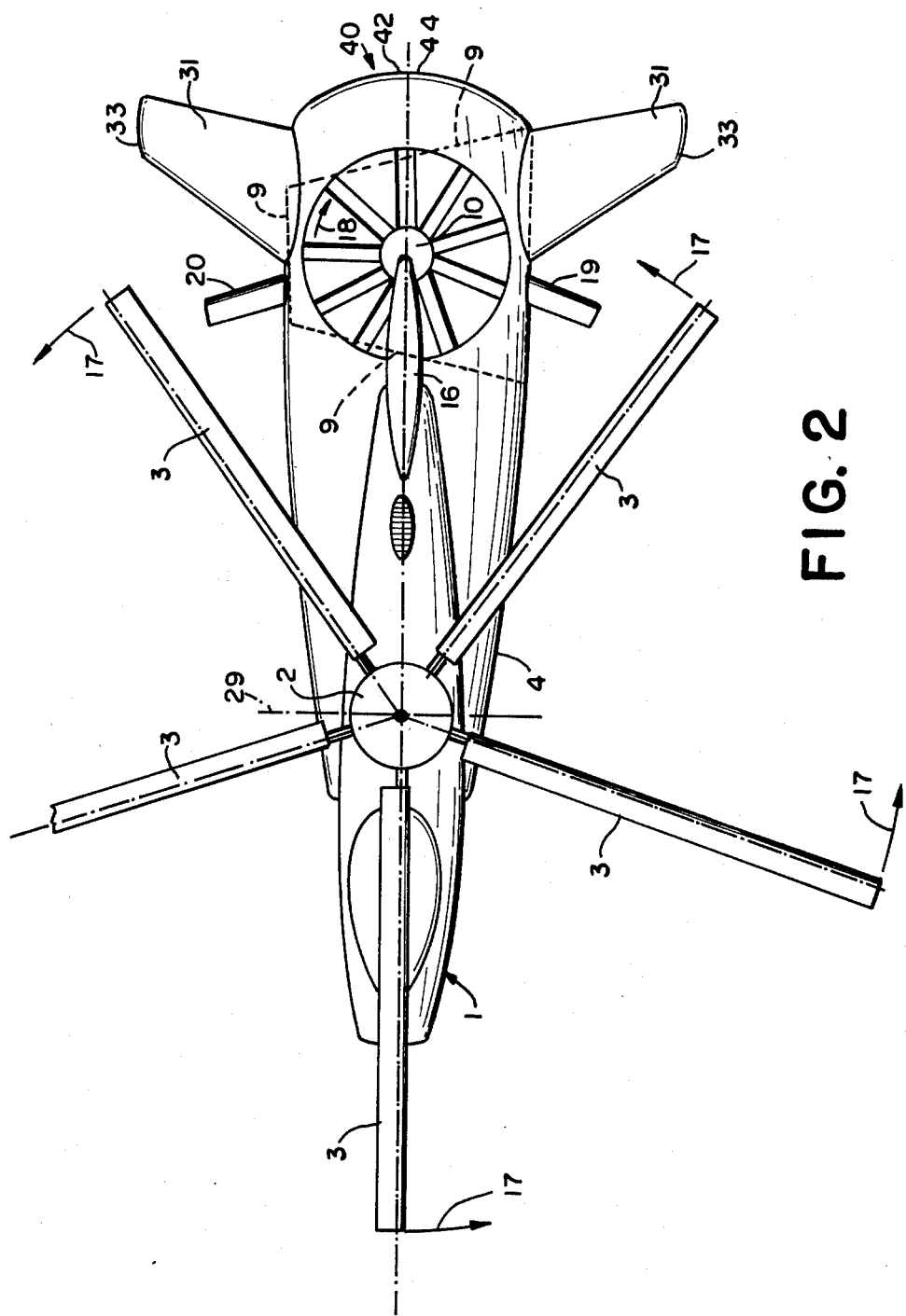
FIG. 2 is a plan or top view of the FIG. 1 embodiment.

In this description main rotor 2 is powered to rotate in the counter clockwise direction 17 when viewed from above. The horizontal axial flow variable pitch fan 10 will be driven by the right angle gear box 12 to rotate clockwise 18 again when viewed from above. The fuselage contains two controllable exit ports, 19 and 20 (however, only 19 is shown in FIG. 1), one on each side of the plenum 13. While two ports are shown other embodiments can include having the ports divided into subports which are not juxtaposed to each other. FIG. 2 shows both controllable exit ports 19 and 20. Controllable exit ports 19 and 20 have different areas. This is shown generally by dash lines 9. The left side controllable exit port 19 is effectively sized to offset the torque of the main rotor 2 while the right side controllable exit port 20 is effectively sized primarily for autorotation yaw control and used with the left side controllable exit port 19.

Figure 4:
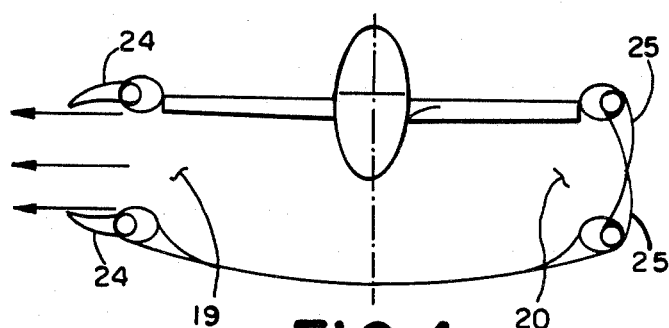

Under normal powered conditions (FIG. 4) the mixer phase unit 21 automatically varies the area of the left side controllable exit port 19 to permit only the necessary reaction to counter the torque of the main rotor 2. Yaw control about the vertical axis 22 is accomplished by pilot yaw control pedals 15 which varies the pitch of the horizontal axial flow variable pitch fan 10 thereby increasing and decreasing the pressure of the plenum 13.

Figure 6:
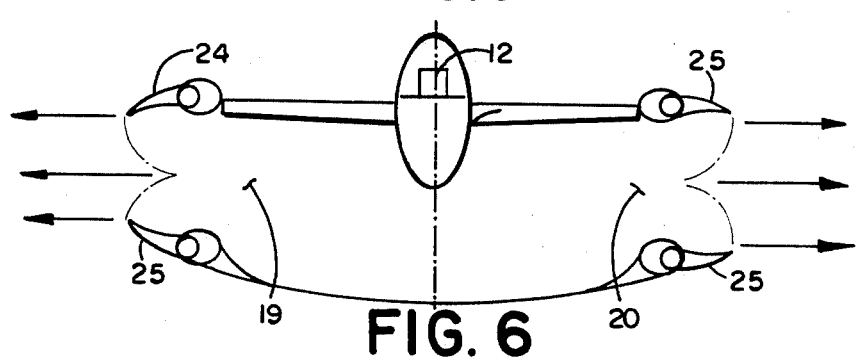

During autorotation, FIG. 6, a low level of main rotor 2 torque exists. Then a torque sensor 23 signals the mixer/phaser unit 21 through transmission means 27 to open the left and right controlable exit ports (19 & 20) to pre-established positions and transferring authority of the pilot yaw control petals 15 from the horizontal axial flow variable pitch fan 10 to vanes 24 and 25, which are on opposite sides of the fuselage 4, and also, positioning the horizontal axial flow variable pitch fan 10 to a pre-established pitch angle. The resulting thrust can now pass to either the left or right side of the plenum 13 by vane positioning. Closing the left controllable exit port vanes 24 exits the pressurized air within the plenum 13 through the right controllable exit port 20 having its vanes 25 fully open producing a right turn. Or by closing the right controllable exit port vanes 25 the pressurized air within the plenum 13 then exits through the left controllable exit port 19 causing a force to the right and resulting in a left turn.

Figure 3:
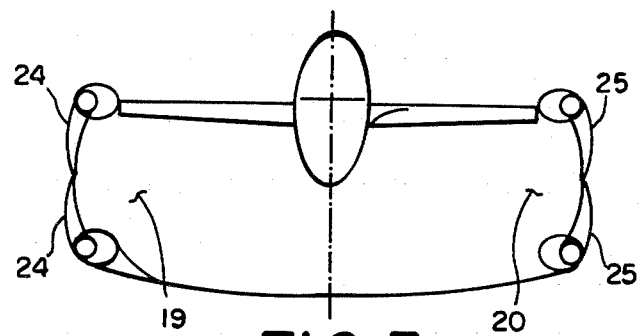
FIGS. 3, 4, 5, and 6 are cross-sectional views taken on line AA of FIG. 1.
Figure 5:
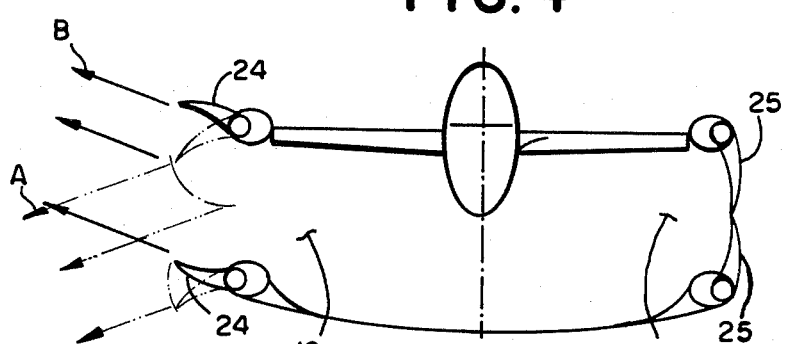

During normal powered flight, FIG. 5, the helicopter's axis 28 may be rotated about the helicopter's lateral axis 29 by operation of vanes 24. The pilot uses the longitudinal trim control 30 to position the left vanes 24 to deflect the pressurized exiting air upwards or downward causing fuselage 4 pitch attitude change. Downward deflection ,A causes an upward component of thrust, resulting in a nose down pitch attitude of the fuselage 4. Upward deflection B reverses the fuselage 4 pitch to a nose up attitude. In FIG. 3 the vanes 24 and 25 are shown in a closed position.

Towards the end of the fuselage fixed aerodynamic surfaces 31 are provided to establish the necessary yaw static stability. The vertical surface area 32 of the fixed aerodynamic surfaces 31 is calculated to meet the requirement that an acceptable degree of fuselage yaw angle be met during restricted powered flight following any failure in the horizontal axial flow variable pitch fan 10 control or drive system. The horizontal tail 33 area is calculated to provide adequate static longitudinal stability of the helicopter. Calculation of said horizontal tail areas and said vertical surface are known to those skilled in the art of aerodynamics.

In another embodiment the plenum 13 is also vented rearward to achieve additional forward thrust. ;. rearward exit port 40 having doors 42 and 44 can have thrust vectoring to produce a force about the lateral axis 29 of the helicopter 1 providing fuselage attitude change in forward flight.

In still another embodiment (not shown) whereby it is desired to reduce vulnerability, redundancy is introduces by providing separate drive system for the fan to minimize the effects of failure or ballistic strikes. Another embodiment is to provide two horizontal axial flow fans, either one stacked upon another, or orienting two on a side by side basis, or fore an aft placement. More than (2) horizontal axial flow fans may be used.

In still another embodiment (not shown) the infrared signature of the helicopter can be reduced in combination with present invention. Hot power plant exhaust gases can be vented into the plenum containing the horizontal axial flow fan. This results in hot power plant gases mixed with cooler ambient air resulting in the gases ejected from the controllable exit ports at a substantial lower temperature than those which would be ejected from the exhaust of the power plant alone.

Further still another embodiment (not shown) exhaust gases from weapons, e.g. rockets, could also be ejected from the plenum in the same manner as set forth for reducing the temperature of the hot power plant exhaust gases.

Vanes 24 and 25 and control means 26 can be considered as one particular means for controlling the direction of pressurized exiting air from the plenum 13 and thereby resulting thrust. More generally the means of controlling can be any suitable variable-geometry device including adjustable slots.

Although the present invention has been described in particular embodiments herein set forth, it is to be understood that the present disclosure has been made only by way of example and that numerous changes in the details of construction may be resorted to without departing in the spirit and scope of the invention. Thus, the scope of the invention should not be limited by the foregoing specification, but rather only by the scope of the following claims of the invention.

What is claimed is:

1. In a helicopter having a main rotor operatively connected to a power plant and a fuselage elongated in a longitudinal direction an improvement for providing yaw and pitch control during forward flight and hover which comprises:
    (a) a horizontally mounted axial flow variable pitch fan mounted substantially behind said main rotor and positioned within a fuselage mounted plenum and said fan operatively connected to the power plant;
    (b) said plenum having two controllable exit ports each located along the longitudinal direction of the fuselage and each are substantially opposite each other and the area of one port is effectively sized to offset the torque of the main rotor and the area of the other port is effectively sized for autorotation yaw control; and
    (c) said plenum has a third rearward facing controllable exit port.

2. The improvement according to claim 1 wherein the fan is located near the entrance to the plenum.

3. The improvement according to claim 2 wherein the edges of the entrance to the fan are a suitably curved.

4. The improvement according to claim 3 wherein the controllable exits ports include of means suitable for varying the area of the ports.

5. The improvement according to claim wherein at least two of said means for controlling the area include horiozontally mounted vanes moveable about their pitch axis.

6. The improvement according to claim 5 wherein the helicopter has two aerodynamic members attached to the rear of fuselage and wherein the vertical surface area of said members surfaces provides an acceptable degree of fuselage angle yaw angle during restricted powered forward flight and the horizontal surface area of said members provides sufficient longitudinal stability for the helicopter during said restricted powered forward flight.

7. The improvement according to claim 6 wherein two or more horizontal axial flow variable pitch fans are within the mounted plenum.

8. The improvement according to claim 6 wherein the plenum is additional vented rearward to a rear controllable exit port.

9. In a helicopter having a main rotor operatively connected to a power plant and a fuselage elongated in a longitudinal direction and having at the aft of the fuselage fixed aerodynamic surfaces which provide an acceptable degree of fuselage yaw angle during restricted powered flight and provide acceptable static longitudinal stability an improvement for hover which comprises:
    (a) a horizontally mounted axial flow variable pitch fan with a fuselage mounted plenum wherein the fan is located having its center of rotation displaced from the center of rotation of said main rotor nearer the upward facing entrance of the plenum then to the bottom of the plenum and the edges of the entrance to the fan are suitably curved and said fan operatively connected to the power plant; and
    (b) said plenum having at least two exit ports having their exit area controllable, said ports each located along the longitudinal direction of the fuselage and each substantially opposite each other and the controllable exit ports include horizontally mounted vanes rotatable about their pitch axis and the area of one port is effectively sized to offset the torque of the main rotor and the area of the other port is effectively sized for autorotation yaw control.

* * * * *

UNITED STATES PATENT AND TRADEMARK OFFICE
CERTIFICATE OF CORRECTION

PATENT NO. : 4,768,737

DATED : September 6, 1988

INVENTOR(S) : William D. Broadley

It is certified that error appears in the above-identified patent and that said Letters Patent is hereby corrected as shown below:

Claim 3, line 2 after the words "the fan are" the word "a" appears. It should be deleted.

Claim 5, line 1 after the word "claim" the number "4" should be inserted.

Claim 6, line 5 after the word "of", the words "fuselage angle" should be deleted. After the word "yaw" the word "angle" should be deleted.

Claim 9, line 7 after the words "improvement for" the following phrase should be inserted --providing yaw and pitch control during forward flight and--

Claim 8, line 2, "additional" should be --additionally--

The title page should be deleted to appear as per attached title page.

The sheet of Drawing consisting of Figure 2 should be deleted to appear as per attached sheet.

Signed and Sealed this

Sixth Day of February, 1990

*Attest:*

JEFFREY M. SAMUELS

*Attesting Officer*  *Acting Commissioner of Patents and Trademarks*

United States Patent [19]

Broadley

[11] Patent Number: 4,768,737
[45] Date of Patent: Sep. 6, 1988

[54] HELICOPTER CONTROL SYSTEM
[75] Inventor: William D. Broadley, Downingtown, Pa.
[73] Assignee: PBSystems, Inc., Downingtown, Pa.
[21] Appl. No.: 21,150
[22] Filed: Mar. 2, 1987
[51] Int. Cl.⁴ ............................................. B64C 27/82
[52] U.S. Cl. ........................... 244/17.21; 244/6; 244/52; 244/23 B
[58] Field of Search ............... 244/6, 7 R, 12.3, 23 B, 244/17.11, 17.19, 17.21, 51, 52

[56] References Cited
U.S. PATENT DOCUMENTS

| 2,420,784 | 5/1947 | Larsen | 244/17.19 |
| 2,567,392 | 9/1951 | Naught | 244/52 |
| 2,968,453 | 1/1961 | Bright | 244/52 |
| 3,171,614 | 3/1965 | Holmer | 244/17.19 |
| 3,179,353 | 4/1965 | Peterson | 244/12.3 |
| 3,807,662 | 4/1974 | Velazquez | 244/17.19 |

FOREIGN PATENT DOCUMENTS 1933353 1/1971 Fed. Rep. of Germany ... 244/17.19

Primary Examiner—Galen Barefoot
Attorney, Agent, or Firm—Lipton & Famiglio

[57] ABSTRACT

An anti-torque system for use in a helicopter has an aft mounted horizontal fan submerged within a fuselage mounted, upward facing plenum. The fan operates off the mainpower source. The plenum has two controllable exit ports for counter torque control, fuselage pitch control and yaw control. The controllable exit ports are located along the longitudinal direction of the fuselage and each are substantially opposite each other. One port has a sufficiently sized area to effectively offset the torque of the main rotor while the other port has a sufficiently sized area to effectively provide autorotative yaw control. Both ports can be used simultaneous or singly.

9 Claims, 3 Drawing Sheets

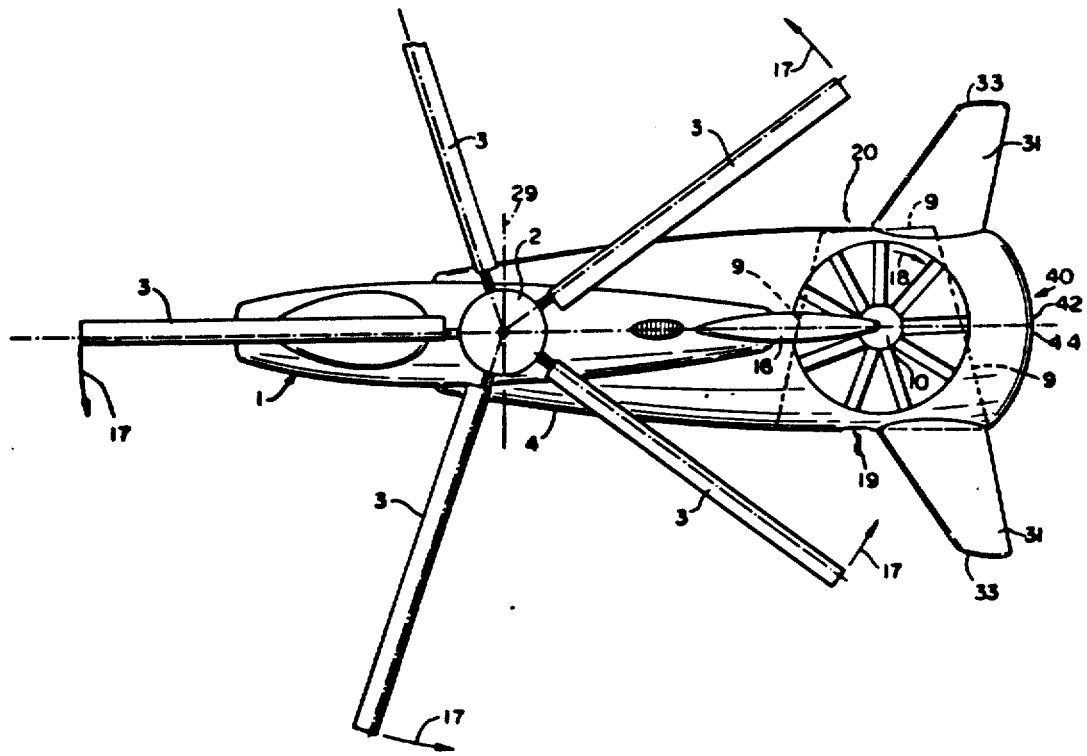

UNITED STATES PATENT AND TRADEMARK OFFICE
CERTIFICATE OF CORRECTION

PATENT NO. : 4,768,737

DATED : September 6, 1988

INVENTOR(S) : William D. Broadley

It is certified that error appears in the above-identified patent and that said Letters Patent are hereby corrected as shown below:

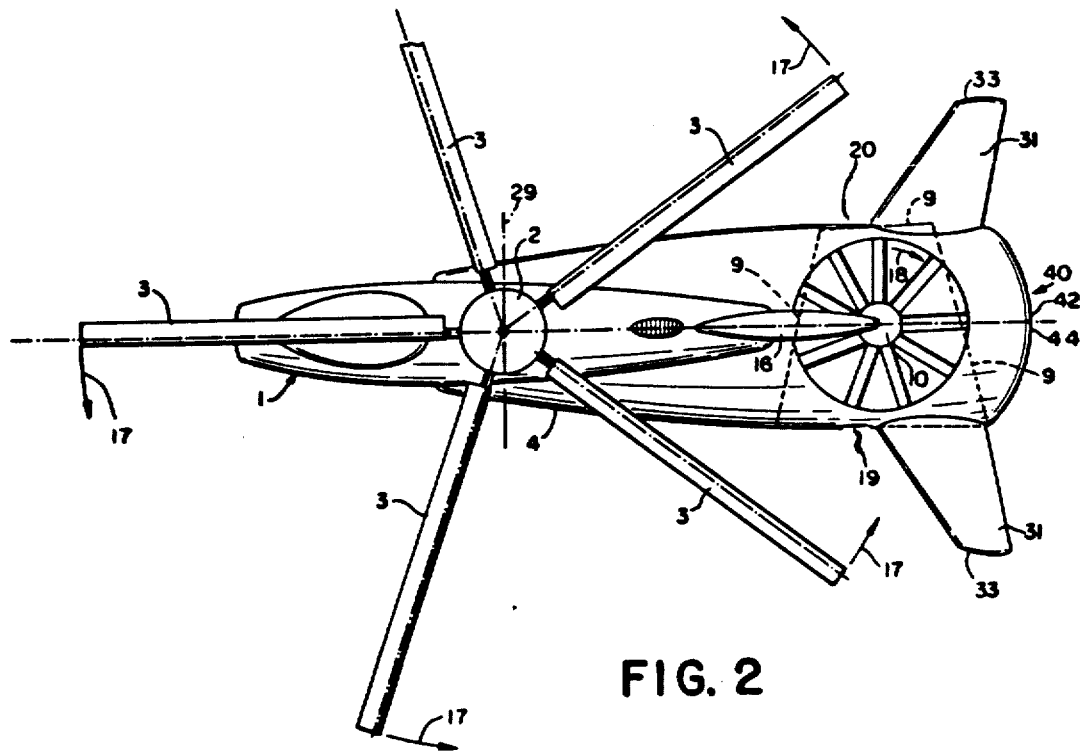

FIG. 2